(12) United States Patent
Inoue

(10) Patent No.: US 7,612,556 B2
(45) Date of Patent: Nov. 3, 2009

(54) ROLLING BEARING

(75) Inventor: Masahiro Inoue, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 324 days.

(21) Appl. No.: 10/517,895

(22) PCT Filed: Oct. 10, 2003

(86) PCT No.: PCT/JP03/13036

§ 371 (c)(1),
(2), (4) Date: Dec. 13, 2004

(87) PCT Pub. No.: WO2004/033995

PCT Pub. Date: Apr. 22, 2004

(65) Prior Publication Data
US 2005/0174106 A1 Aug. 11, 2005

(30) Foreign Application Priority Data

| Oct. 10, 2002 | (JP) | ............................. 2002-297920 |
| Oct. 10, 2002 | (JP) | ............................. 2002-297921 |
| Oct. 10, 2002 | (JP) | ............................. 2002-297922 |
| Oct. 10, 2002 | (JP) | ............................. 2002-297923 |

(51) Int. Cl.
*G01B 7/30* (2006.01)
(52) U.S. Cl. ............. 324/207.25; 324/173; 324/207.17; 384/448
(58) Field of Classification Search ............ 324/207.25, 324/173, 207.17; 384/448
See application file for complete search history.

(56) References Cited

U.S. PATENT DOCUMENTS

| 5,263,366 A | * | 11/1993 | Sakamoto ................... 73/118.1 |
| 5,624,192 A | * | 4/1997 | Rigaux et al. ............... 384/448 |
| 5,914,548 A | | 6/1999 | Watanabe |
| 6,250,811 B1 | * | 6/2001 | Mizukoshi et al. .......... 384/448 |
| 2001/0030533 A1 | * | 10/2001 | Iwamoto et al. ............. 324/174 |
| 2002/0130655 A1 | * | 9/2002 | Okada et al. ................. 324/174 |
| 2004/0062459 A1 | * | 4/2004 | Bochet ........................ 384/448 |

FOREIGN PATENT DOCUMENTS

| JP | 56-110304 | 8/1981 |
| JP | 9-238438 | 9/1997 |
| JP | 11-313470 | 11/1999 |
| JP | 2000-18968 | 1/2000 |
| JP | 2000-258187 | 9/2000 |
| JP | 2001-201362 | 7/2001 |
| JP | 2002-031147 | 1/2002 |
| JP | 2002-31147 | 1/2002 |
| JP | 2002-84724 | 3/2002 |
| JP | 2002-206528 | 7/2002 |

* cited by examiner

*Primary Examiner*—Patrick J Assouad
*Assistant Examiner*—David M. Schindler
(74) *Attorney, Agent, or Firm*—Jordan and Hamburg LLP

(57) ABSTRACT

The rolling bearing apparatus of the present invention comprises a rolling element, a non-rolling element disposed concentrically with the rolling element, and a rotation detector for outputting an input exciting voltage by converting it to an induced voltage according to the relative rotation state of the rolling element and the non-rolling element. The rotation detector comprises a rotor provided in the rolling element, a stator provided in the non-rolling element, and an exciting winding and output windings being wound to the stator. The output windings induce a voltage according to the gap permeance between the rotor and the stator in response to the exciting voltage inputted to the exciting winding.

12 Claims, 17 Drawing Sheets

US 7,612,556 B2

ROLLING BEARING

TECHNICAL FIELD

The present invention relates to a rolling bearing apparatus and, more particularly, to a rolling bearing apparatus to which a rotation detector is mounted.

BACKGROUND ART

Conventionally, there are rolling bearing apparatuses to which a rotation detector is installed. There are a passive type and an active type in such rotation detector. The active type can detect a non-rolling state, thereby achieving rotation detection with high precision. The active-type rotation detector includes a pulser ring and a magnetic sensor. The pulser ring is made of a multipolar magnet in which the north pole and the south pole are alternately disposed in a circumferential direction and mounted on the rolling element side out of the inner ring and the outer ring of the rolling bearing. The magnetic sensor is mounted on the non-rolling element side of the rolling bearing opposing the pulser ring. As for the operation, pulse signals are to be outputted from the magnetic sensor according to the rotation of the pulser ring which synchronously rotates with the rolling element and the rotation state of the rolling element is detected by processing the pulse signals. In order to further improve the accuracy of the rotation detection in such active-type rotation detector, it is proposed to reduce each pitch of the magnetic poles of the pulser ring. However, there is a limit in reducing the pitch, which results in limiting the improvement in the accuracy of the rotation detection.

DISCLOSURE OF THE INVENTION

A rolling bearing apparatus of the present invention comprises a rolling element, a non-rolling element disposed concentrically with the rolling element, and a rotation detector for outputting an input exciting voltage by converting it to an induced voltage according to the relative rotation state of the rolling element and the non-rolling element.

Preferably, the rotation detector comprises a rotor provided in the rolling element, a stator provided in said non-rolling element, and an exciting winding and output windings being wound to the stator. The output windings induce a voltage according to a gap permeance between the rotor and the stator in response to the exciting voltage inputted to the exciting winding.

Preferably, the stator comprises a plurality of polar teeth provided in the surface of the non-rolling element opposing the rolling element, and the exciting winding and the output windings are provided by being wound to each polar tooth of the stator. Further, the rotor comprises a flat portion formed on a circumference of the surface in the rolling element which opposes the plurality of polar teeth provided in the non-rolling element.

Preferably, the rolling element is an inner ring, the rotor is formed by an outer peripheral shoulder of the inner ring, and a flat portion is formed on the circumference of the outer peripheral shoulder.

With the present invention, the non-rotation state of the rolling element can be successfully detected and also the rotation state of the rolling element can be detected in detail with high accuracy since the induced voltage is outputted in which amplitudes change with no phase according to the rotation state of the rolling element.

The above-described tolling element comprises members which rotate by being disposed concentrically with the non-rolling element, e.g., the inner ring, a hub wheel, a nut. Especially, when the non-rolling element is the outer ring, the rolling element comprises the inner ring, the hub wheel, the nut and the like as the members which are disposed in the inward-radial direction with respect to the outer ring.

BEST MODE FOR CARRYING OUT THE INVENTION

Figure 1:
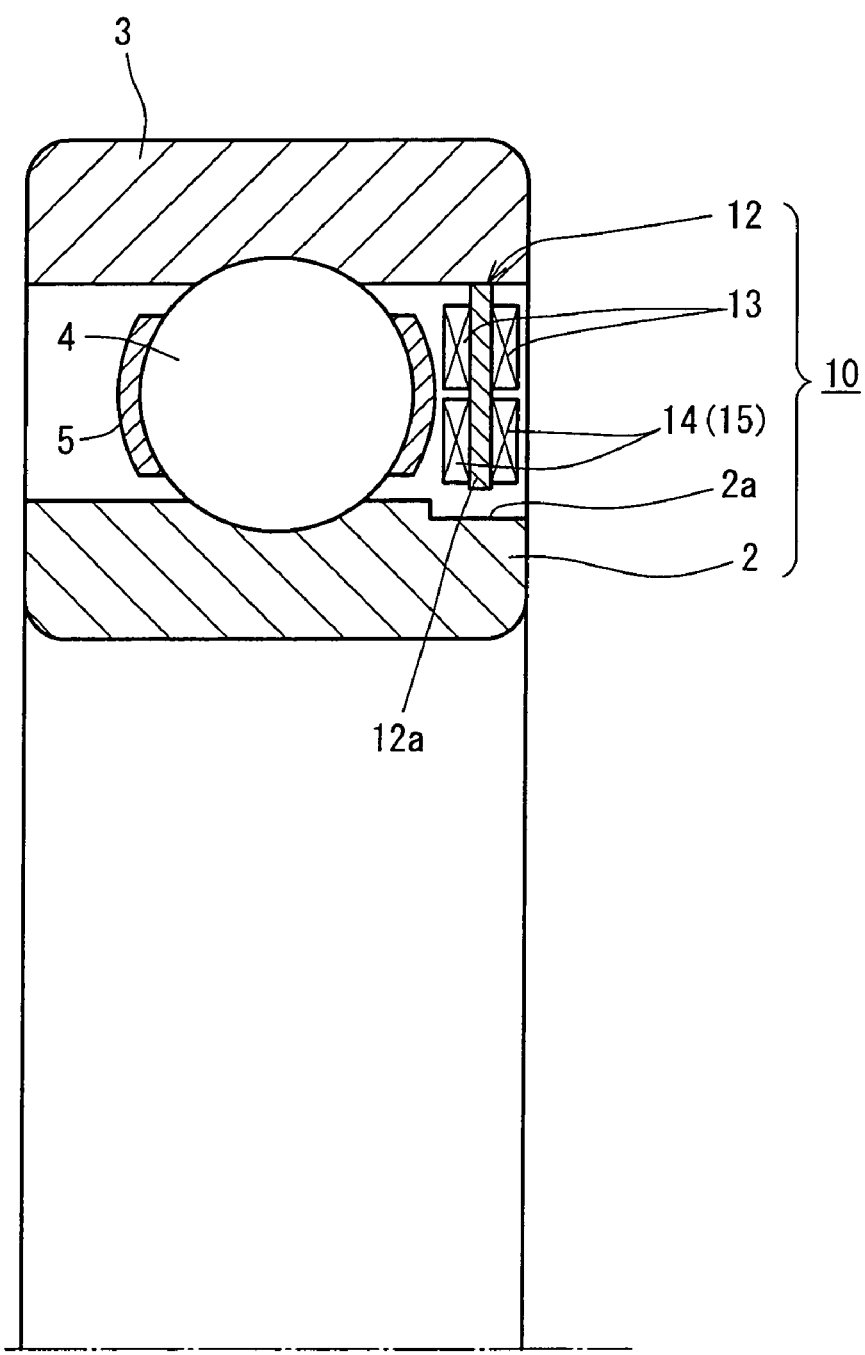
FIG. 1 is a cross-sectional view showing a rolling bearing apparatus according to a preferred embodiment of the present invention.
Figure 2:
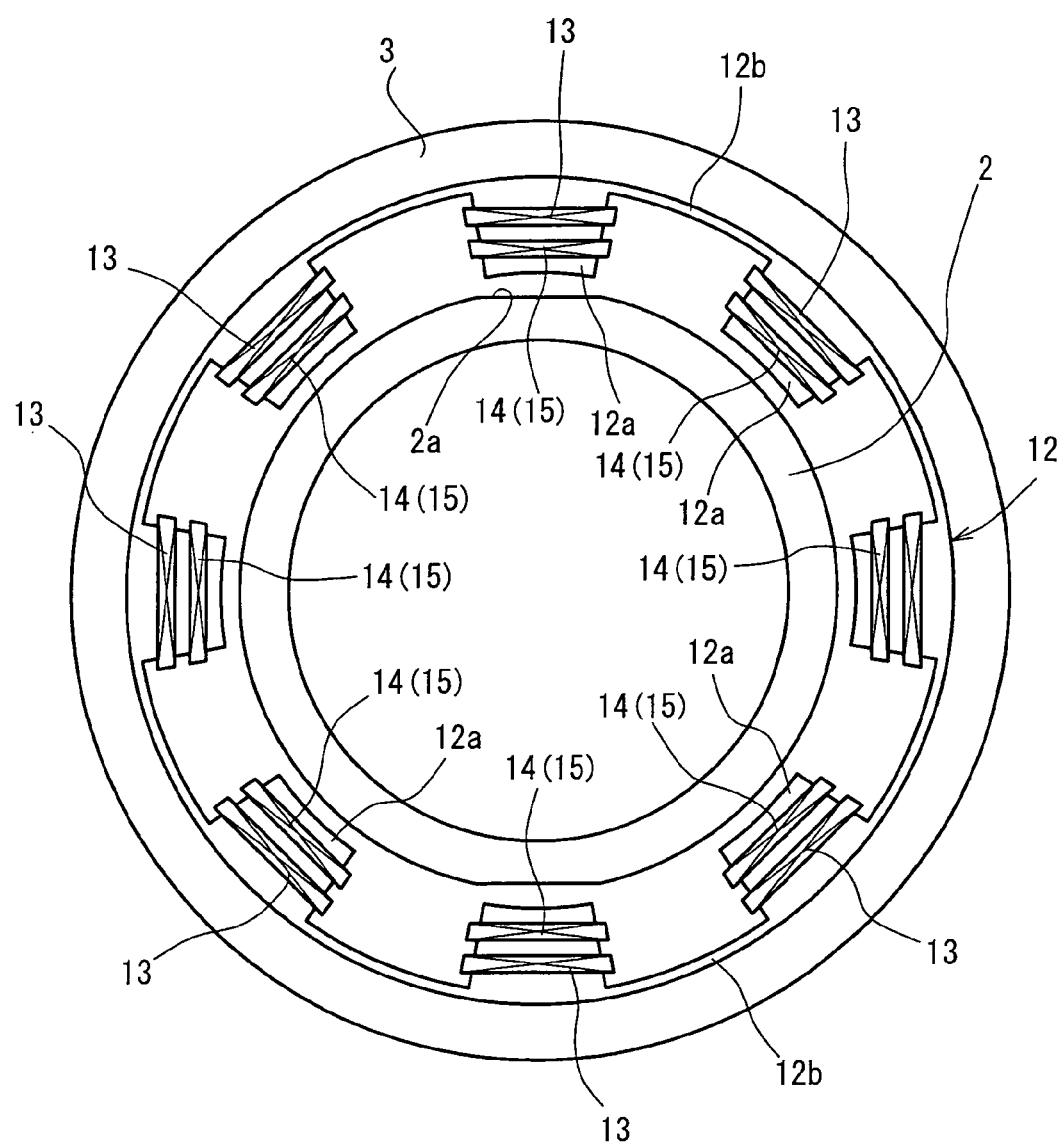
FIG. 2 is a side view of the rolling bearing apparatus shown in FIG. 1 as viewed from a brushless resolver side.
Figure 3:
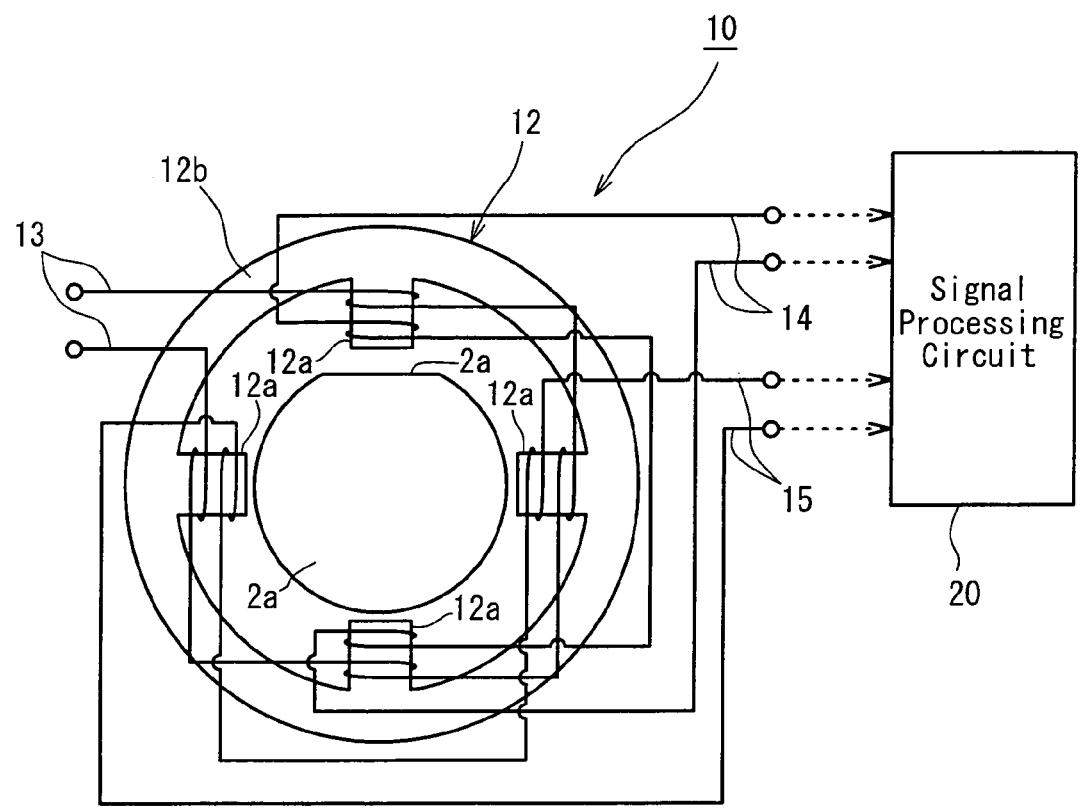
FIG. 3 is a schematic illustration showing a configuration of the brushless resolver shown in FIG. 1.

FIG. 1 to FIG. 3 show the best mode for carrying out the present invention. The rolling bearing apparatus comprises an inner ring 2 as a rolling element, an outer ring 3 as a non-rolling element, a plurality of balls 4 and a cage 5. The outer ring 3 is fitted to the inside openings of a housing (not shown) and the like to be a non-rolling element, and is disposed concentrically with the inner ring 2 on the outer periphery side. The balls 4 are housed inside a plurality of pockets provided in the cage 5 so as to be inserted in the circular space between the inner ring 2 and outer ring 3 at regular intervals on the circumference.

A brushless resolver 10 is a VR (variable reluctance) type and is installed to the rolling bearing apparatus as the rotation detector. The resolver 10 detects the rotation state (non-rotation state, rotation angle, rotation speed, rotation direction and the like) of the inner ring 2. The resolver 10 uses the inner ring 2 as a rotor. The resolver 10 comprises a stator 12, an exciting winding 13, and two output windings 14, 15. The resolver 10, for example, is a one-phase exciting/two-phase output type resolver. The inner ring 2 is made of a magnetic material. A flat portion 2a is provided in a region on the circumference at a prescribed angle in the outer periphery shoulder of the inner ring 2 and other outer peripheral surface is in a circular shape. The outer periphery shoulder of the outer ring 2 may be in any shapes such as an oval, and a rice-ball shape as long as it is the shape which changes the gap permeance in between the outer peripheral surface of each tooth 12a in accordance with the rotation. The rotor may be formed with a material different from that of the inner ring 2.

The stator 12 is made of a magnetic material and fixed by being press-fitted to the inner peripheral shoulder of the outer ring 3. The inner periphery of the stator 12 is in a comb shape. The exciting winding 13, the output windings 14, 15 are wound, as necessary, to the tooth 12a provided in some areas on the circumference of the stator 12. A thin connecting part 12b is provided in between each tooth 12a as the magnetic paths. In FIG. 2, the number of the polar teeth 12a provided is 8, however, in FIG. 3, the number is 4 for the conveniences' sake of presenting description. The minimum number of the polar teeth 12a is 2, which are being shifted from one another by 90° in the circumferential direction, and when increasing the number, it should be the multiples of 2. The ball set bore diameter of the polar teeth 12a of the stator 12 is set to be slightly larger than the diameter of the inner ring 2.

It is preferable that the rotor and the stator are made of a magnetic material with a small magnetic resistance and a high magnetic saturation density, e.g., a soft magnetic material. Specifically, there are a magnetic material containing iron as a main component and a magnetic material containing nickel as a main component. Examples are a laminated silicon steel plate or a single-layered silicon steel plate, permalloy (alloy of iron and nickel), ferrite, soft ferrite ceramic and the like. Needless to say, by using the material with a smaller reluctance as described above as the magnetic material for the rotor and the stator constituting such resolver, the change in the gap permeance between the rotor and the stator in accordance with the rotation of the rotor can be clearly detected. Thus, the precision of generating the induced voltage (rotation state detection voltage) of the winding according to the change is improved so that it is preferable for improving the accuracy of detecting the rotation state.

The exciting wiring 13 is wound in series to each tooth 12a of the stator 12. The output windings 14, 15 are distributed-wound to each tooth 12a so that each induced voltage distribution becomes a sine wave distribution. When the sine wave exciting voltage is inputted to the exciting winding 13, wave-shaped two-phase alternating voltage signals, which are electrically shifted from each other at 90°, are outputted from each of the output windings 14, 15. For example, when the sine wave exciting voltage is inputted to the exciting winding 13, a sine wave signal is outputted from the output winding 14 and a cosine wave signal which is shifted from the sine wave signal at 90° is outputted from the output winding 15.

In the resolver 10, when the inner ring 2 rotates under the state where one-phase alternate voltage is applied to the exciting winding 13, the gap permeance between the outer peripheral surface and the inner peripheral surface of each tooth 12a of the stator 12 changes in order and each of the output windings 14, 15 outputs the sine wave and cosine wave signals whose amplitude change in accordance with the change in the gap permeance. The output signals are inputted to a signal processing circuit 20. When the inner ring 2 is at rest, the gap permeance between the outer peripheral surface and the inner peripheral surface of each tooth 12a of the stator 12 does not change so that each of the output windings 14, 15 outputs the sine wave and cosine wave signals with almost constant amplitude.

The signal processing circuit 20 may be a known R/D (resolver/digital) converter and a DSP (digital signal processor), and performs recognition processing of the rotation state (stop position, rotation direction, rotation angle, rotation speed and the like) of the inner ring 2 through a known signal processing based on input signals.

As described above, it has a configuration in which the resolver 10 is mounted on the rolling bearing apparatus. Therefore, it is possible to successfully detect the non-rotation state where the inner ring 2 is at rest and also to detect the rotation state of the inner ring 2 with higher precision than that of the active-type rotation detector. The inner ring 2 also serves as the rotor of the resolver 10 so that the configuration is simplified and the cost can be reduced. The dimension of the inner peripheral surface of the outer ring 3 is adjusted with high precision by polishing and the like. Thus, the mounting accuracy of the resolver 10 is improved which contributes to the improvement in the accuracy of detecting the rotation by the resolver 10.

In the present invention, the resolver 10 is unified with the rolling bearing apparatus so that the resolver can work at its original characteristic and improve the accuracy of detecting the rotation state. For example, in an ordinal resolver, allowable value of the run-out precision (axial run-out precision) of the rotor and the stator in the radial direction is 50 μm or less and the allowable shift amount of the rotor and the stator in the axial direction is ±250 μm. In a deep groove ball bearing according to the embodiment, for example, when the precision is in a regular class and the nominal dimension of the inner diameter d of the inner ring is 10 mm to 80 mm, the run-out precision in the radial direction (radial inner clearance) is about 3 μm to 30 μm and the allowable shift amount in the axial direction (axial inner clearance) is 0 to 220 μm, which sufficiently meet the allowable precision for mounting the resolver. The above-described values are the precision of a single rolling bearing itself and when the rolling bearing is mounted between the housing and a spindle, the inner clearance becomes further reduced, thereby further improving the precision. Balls of the rolling bearing apparatus may be provided in double rows. The rolling bearing apparatus 1 maybe various ball bearings such as a roller bearing, a tapered roller bearing and the like.

ANOTHER EMBODIMENT

Another embodiment of the present invention will be described hereinafter.

Figure 4:
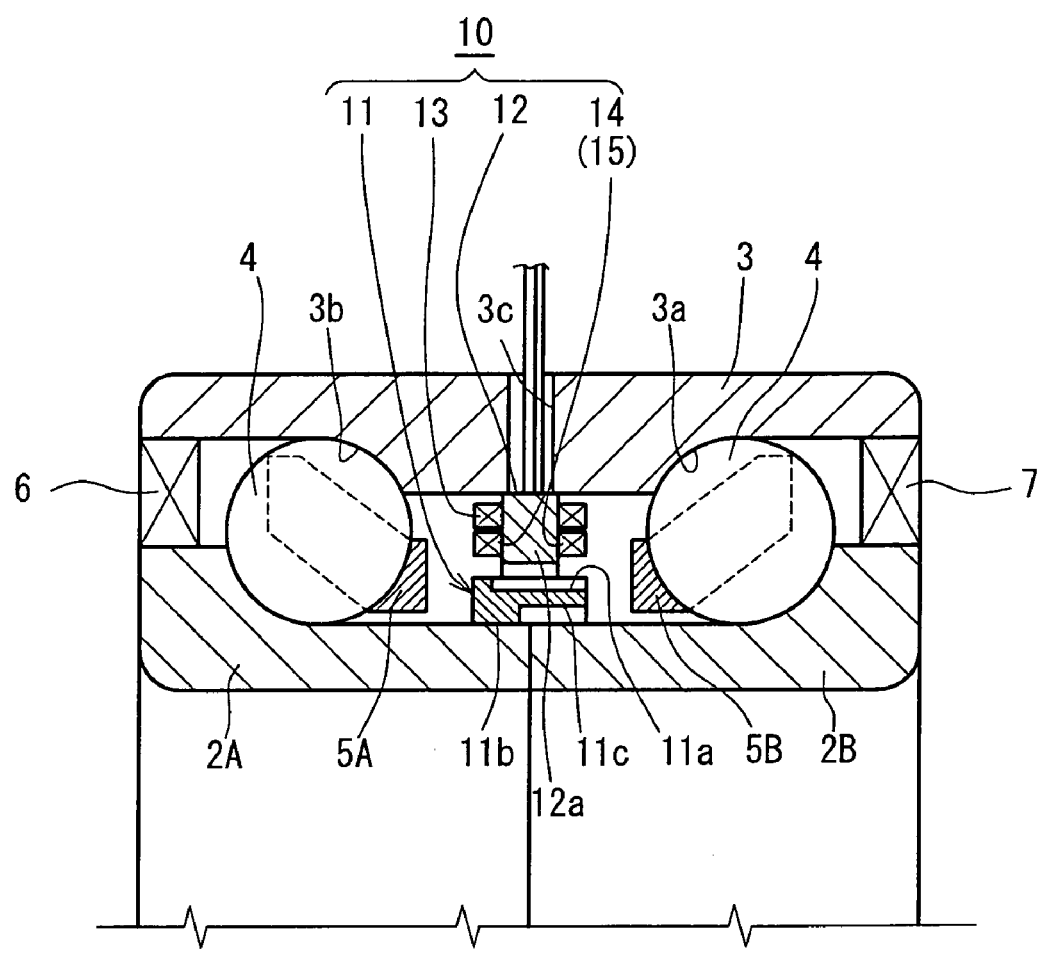
FIG. 4 is a cross-sectional view showing a rolling bearing apparatus according to another embodiment of the present invention.

As shown in FIG. 4, the rolling bearing apparatus is an angular ball bearing type and comprises an outer ring 3 as a non-rolling element, two inner rings 2A, 2B as rolling elements, a plurality of balls 4, two cages 5A, 5B, and two seals 6, 7. Two raceway grooves 3a, 3b are formed being separated away from each other in the inner peripheral surface of the outer ring 3 in an axial direction. The stator 12 of the resolver 10 is mounted between the two raceways 3a, 3b. The stator 12 is fixed by being press-fitted to the outer ring 3. The rotor 11 of the resolver 10 is disposed in the outer periphery of the area where the inner rings 2A, 2B face each other in the axial direction.

The rotor 11 comprises a flat portion 11a in a prescribed angle range of the outer peripheral surface. A region 11b which is a half-portion of the inner peripheral surface of the rotor 11 in the axial direction is fixed by being press-fitted to the inner end side of the first inner ring 2A in the axial direction and the inner diameter of the other half-portion of the region 11c in the axial direction is set to be larger than that of the region 11b. Thereby, the region 11c becomes non-contact with the second inner ring 2B. The exciting winding 13 and the output windings 14, 15 are lead out to the outside through a through-hole 3c provided in one area in the center on the circumference of the outer ring 3 in the axial direction.

Figure 5:
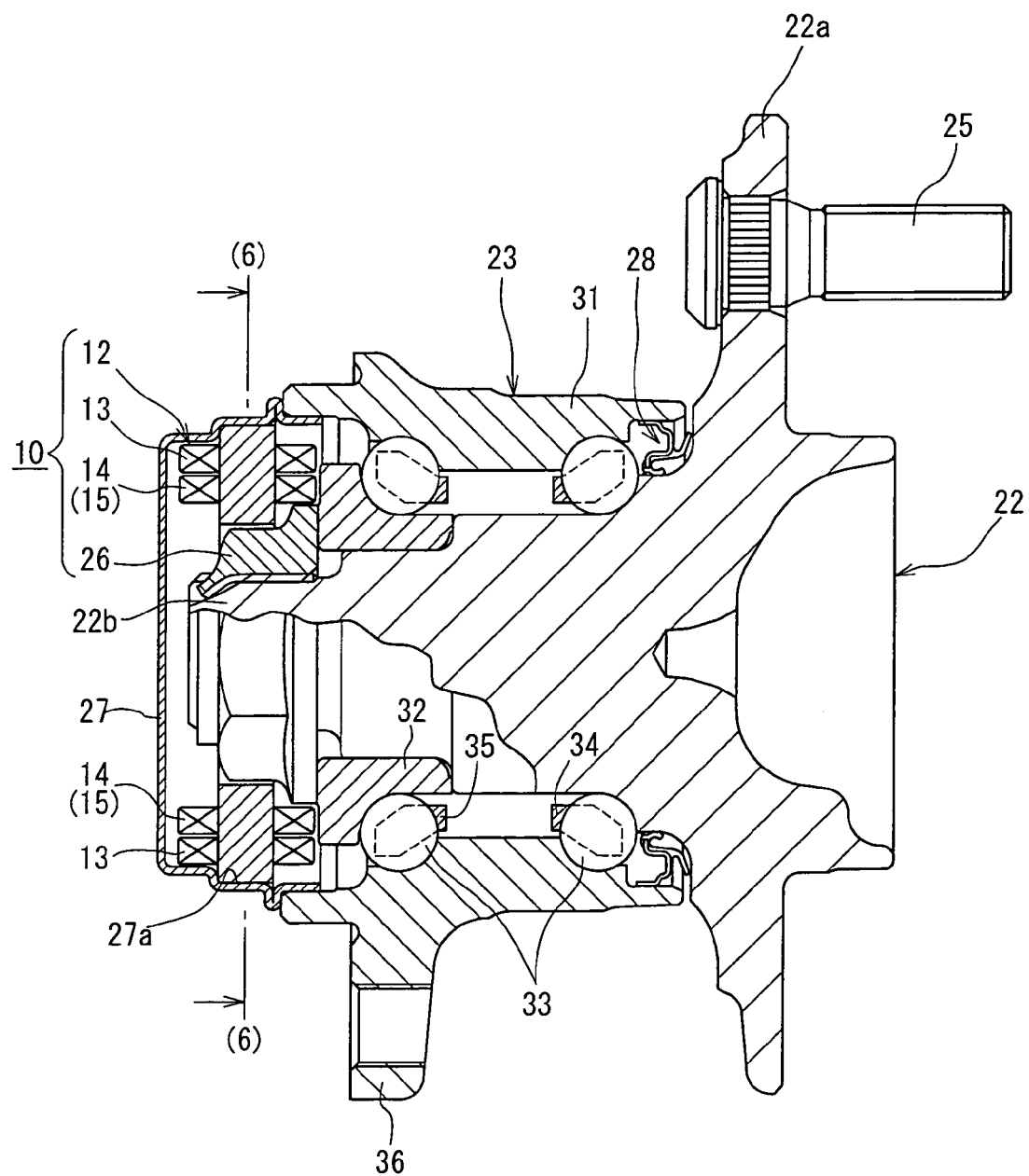
FIG. 5 is a cross-sectional view showing a wheel-use rolling bearing apparatus according to still another embodiment of the present invention.
Figure 6:
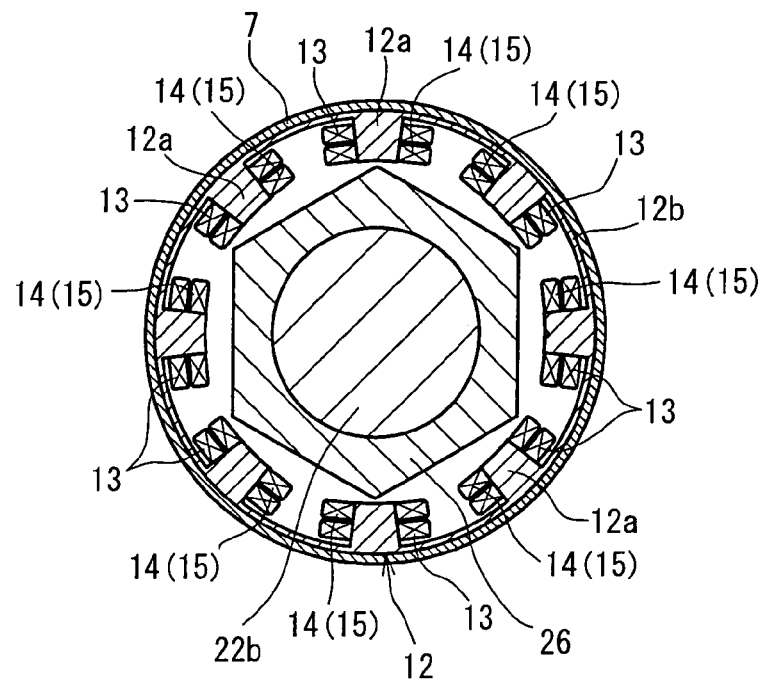
FIG. 6 is a perspective view taken along the line (6)-(6) in FIG. 5.
Figure 7:
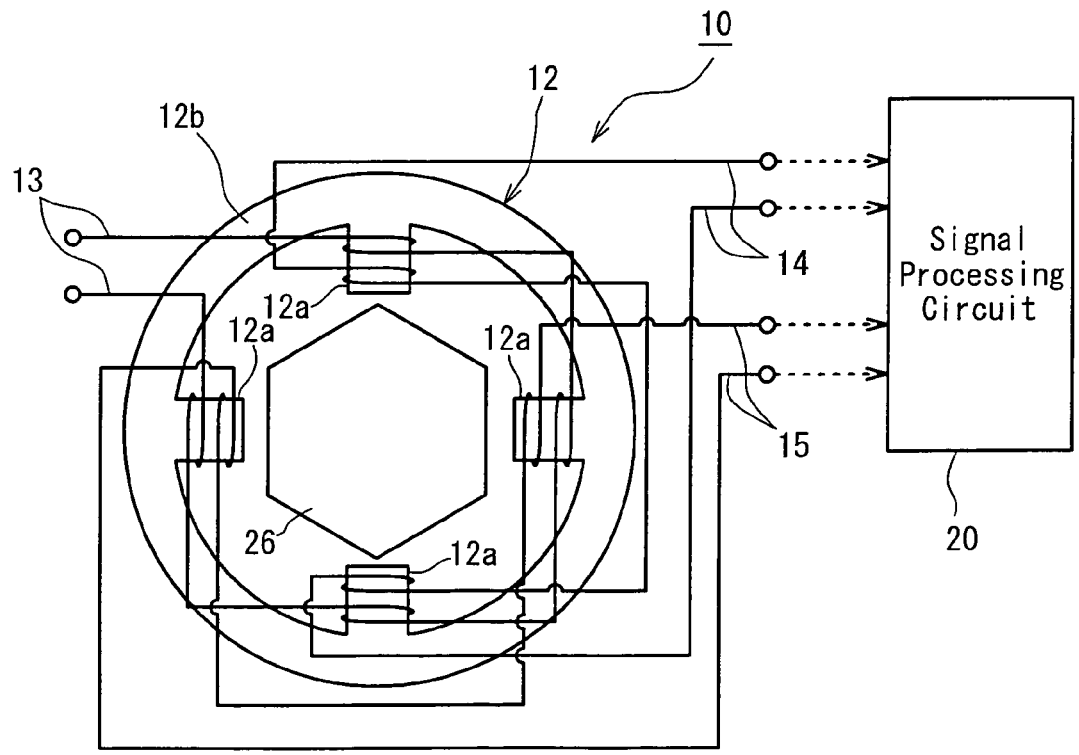
FIG. 7 is a schematic illustration showing a configuration of the brushless resolver shown in FIG. 5.

As shown in FIG. 5 to FIG. 7, the rolling bearing apparatus is used for supporting the idler wheel of an automobile. The rolling bearing apparatus comprises a hub wheel 22 and a double row rolling bearing 23. A flange 22a extending towards the outward-radial direction is formed in the outer peripheral surface of the hub wheel 22 closer to the one of the spindle end. The double row rolling bearing 23 is mounted outside on the outer peripheral surface on the inner side of the vehicle than the flange 22a of the hub wheel 22. A nut spindle part 22b with a small diameter is provided in an end of the hub wheel 22 on the vehicle inner side.

The double row rolling bearing 23 is a double row angular contact ball bearing with vertex of contact angles outside of bearing, and comprises a single outer ring 31 having double row raceway grooves, a single inner ring 32 having a single row raceway groove being mounted outside the small-diameter outer peripheral surface of the hub wheel 22, a plurality of balls 33 arranged in double rows, and two cup-type cages 34, 35. The large-diameter outer peripheral surface of the hub wheel 22 is the inner ring raceway surface of the ball groups 33 in one of the rows. A flange 36 extending towards the outward-radial direction is formed in the outer peripheral surface of the outer ring 31. The flange 36 is fixed to a carrier to be a part of a vehicle body or to a knuckle through a bolt. The disc rotor and the wheels of the disc brake gear are fixed by being pinched in between the outer side surface of the hub wheel 22 on the vehicle outer side of the flange 22a and a nut being screw-fitted to bolts 25 which are through-fitted to several areas on the circumference of the flange 22a.

The inner ring 32 is unified with the hub wheel 22 through a hexagonal nut 26 as a rolling element being screw-fitted to the screw spindle 22b. Thereby, the hub wheel 22 becomes a rolling element and the outer ring 31 becomes a non-rolling element. A cap 27 is mounted on one end of the outer ring 31 on the vehicle inner side and seals the opening of the inner ring 31 on the vehicle inner side. A seal ring 28 is mounted on an end of the outer ring 31 on the outer side, forming a contact sealed area between with the outer peripheral surface of the hub wheel 22. Grease (not shown) is enclosed inside the opposing space between the outer ring 31 and the inner ring 32 formed by the cap 27 and the seal ring 28.

In the above-described rolling bearing apparatus, a VR-type resolver 10 as a rotation detector is mounted. The resolver 10 detects the rotation state (rotation stop state, rotation angle, rotation speed, rotation direction and the like) of the hub wheel 22. The resolver 10 comprises the stator 12, the exciting winding 13, the output windings 14, 15, and a hexagonal nut 26 which is a rolling element serving as the rotor. The resolver 10 is a one-phase exciting/two-phase output type.

The hexagonal nut 26 is made of a magnetic material and the outer peripheral surface is formed to be in the shape which changes the gap permeance between with the internal diameter face of the stator 12 in accordance with the rotation. It may be, in addition to the above-described shape, an oval, a rice-ball shape and the like. The rotor may be provided as a separate member without using the hexagonal nut 26 as the rotor.

The stator 12 is made of a magnetic material and fixed to the inner periphery of a cylindrical part 27a of the cap 27 by press-fitting and the like. The inner periphery of the stator 12 is to be in a comb shape. The exciting winding 13 and the output windings 14, 15 are wound to the polar teeth 12a provided in several areas of the stator 12. A thin connecting part 12b is provided in between each tooth 12a as a magnetic path.

The rolling bearing apparatus comprising the above-described configuration as shown in FIG. 5 to FIG. 7 can successfully detect by the resolver 10 the non-rolling state where the hub wheel 22 is at rest and also detect the rotation state of the hub wheel 22 with higher precision than that of the active-type rotation detector. Therefore, in a vehicle to which the bearing apparatus is mounted, the output of the resolver 10 can be used, for example, as the moving information such as a global positioning system (GPS) to extend the applicability. On the other hand, the hexagonal nut 26 is also used as the rotor of the resolver 10 so that the configuration can be simplified and the cost can be reduced.

In the case of the above-described rolling bearing apparatus, in general, it is used with a negative clearance by applying a preload. Thus, the shift amount in both the radial direction and the axial direction is "0". Thereby, the allowable accuracy of mounting the resolver is sufficiently satisfied so that the accuracy of detecting the rotation state of the resolver can be improved. Also, in other types of the rolling bearing apparatuses such as a tapered roller bearing and a cylindrical roller bearing, the precision in the radial direction and the axial direction is excellently controlled so that the accuracy of detecting the rotation state of the resolver 10 can be improved.

The positional relation of the stator and the rotor may be reversed from the one described in each of the above-described embodiments, i.e., the stator may be disposed on the inner diameter side and the rotor is disposed on the outer diameter side. For example, as the rolling bearing apparatus, there is a case where the outer ring is rotatable and the inner ring is non-rotatable. In such a case, contrary to the above-described configuration, the rotor of a brushless resolver may be unified with the outer ring and the stator of the resolver may be mounted to the inner ring. As the rotation detector, other types of resolvers and brushless synchro may be used.

The hub wheel 22 and the inner ring 32 may be unified by, without using the hexagonal nut 26, making the end of the hub wheel 22 on the vehicle inner side be in a cylindrical shape and pressing the cylindrical part against the outer end face of the inner ring 32 after spreading it in the outward-radial direction through rolling caulking. In this case, the outside surface of the caulked part formed in the end part of the hub wheel 22 on the vehicle inner side may be formed in a shape to serve as the rotor of the resolver 10. Also, the rotor may be separately mounted on the outer periphery of the caulked part.

Figure 8:
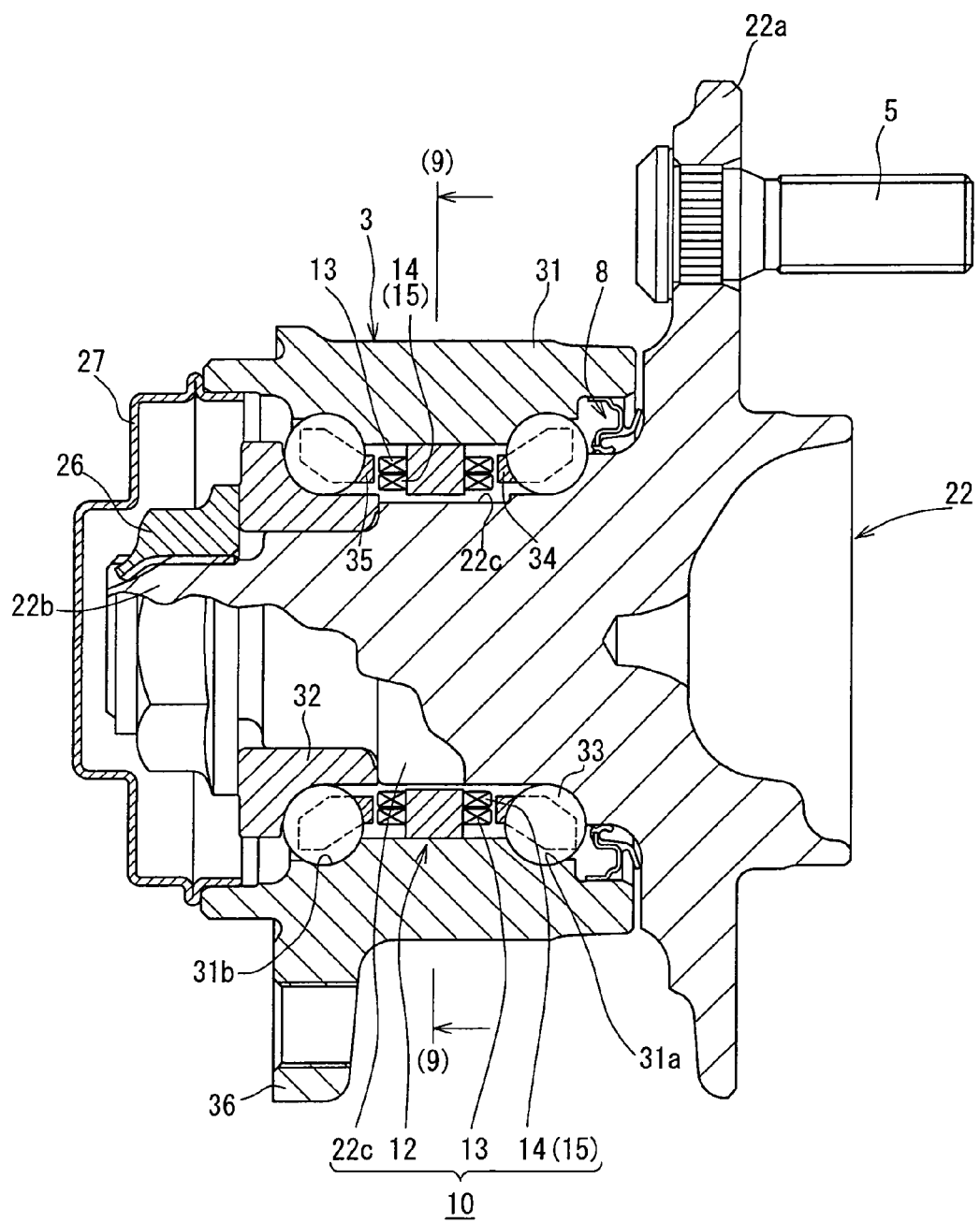
FIG. 8 is a cross-sectional view showing a wheel-use rolling bearing apparatus according to a further embodiment of the present invention.
Figure 9:
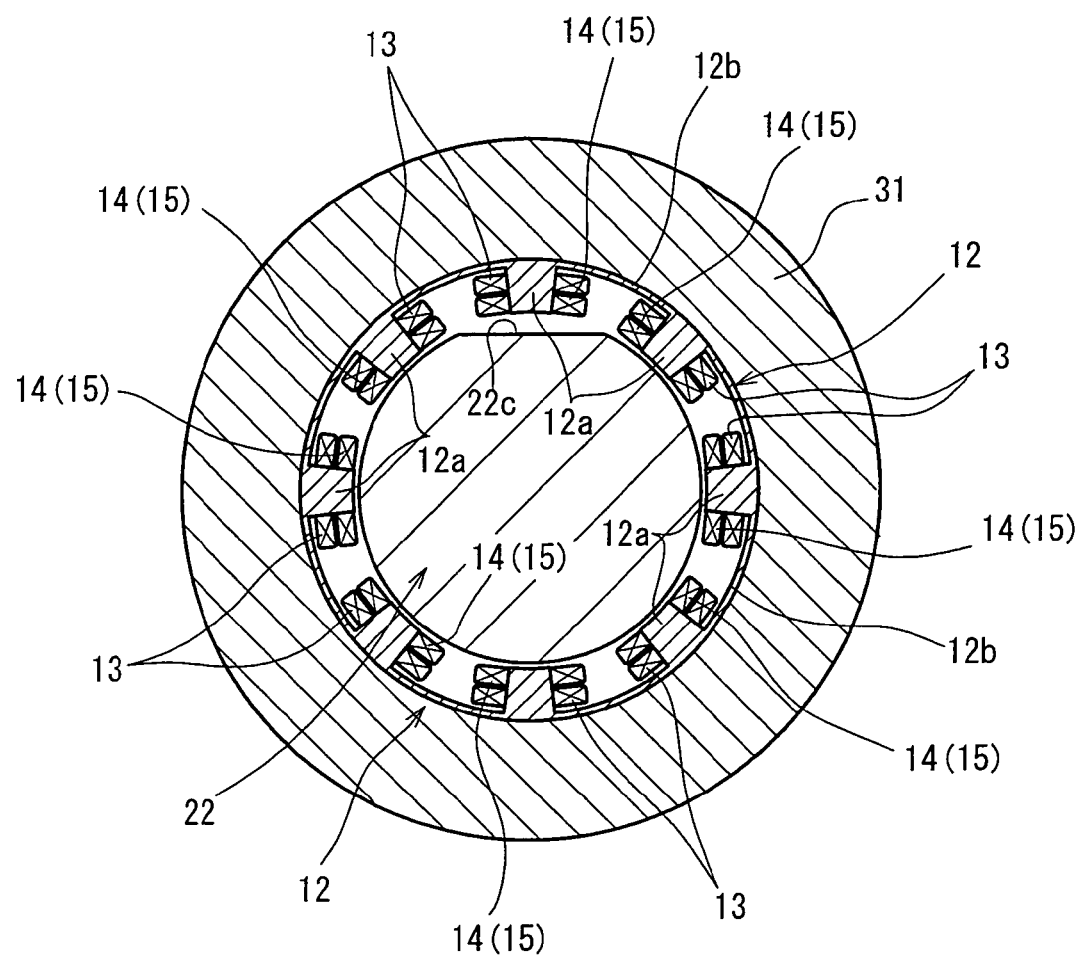
FIG. 9 is a perspective view taken along the line (9)-(9) in FIG. 8.

As shown in FIG. 8 and FIG. 9, the resolver 10 is disposed in the region between the double row raceway grooves 31a, 31b of the outer ring 31 as a non-rolling element in the axial direction. The stator 12 of the resolver 10 is mounted in the inner peripheral surface in the intermediate area of the outer ring 31 in the axial direction. Notches 22c are provided in several areas on the circumference of the outer peripheral surface of the hub wheel 22 as the rolling element which opposes the stator 12. With the notches 22c, the outer periphery surface of the hub wheel 22 becomes the rotor of the resolver 10. The stator 12 is fixed to the outer ring 31 by being press-fitted. The exciting winding 13 and the output windings 14, 15 are lead out to the outside from a through-hole provided in one area on the circumference in the center of the outer ring 31 in the axial direction. Although not shown in figure, the rotor of the resolver 10 may be mounted outside in a prescribed region of the hub wheel 22 as a separate element. The dimension of the inner peripheral surface of the outer ring 31 is adjusted with high precision by polishing and the like, which contributes to the improvement in the detection accuracy of the resolver 10.

Figure 10:
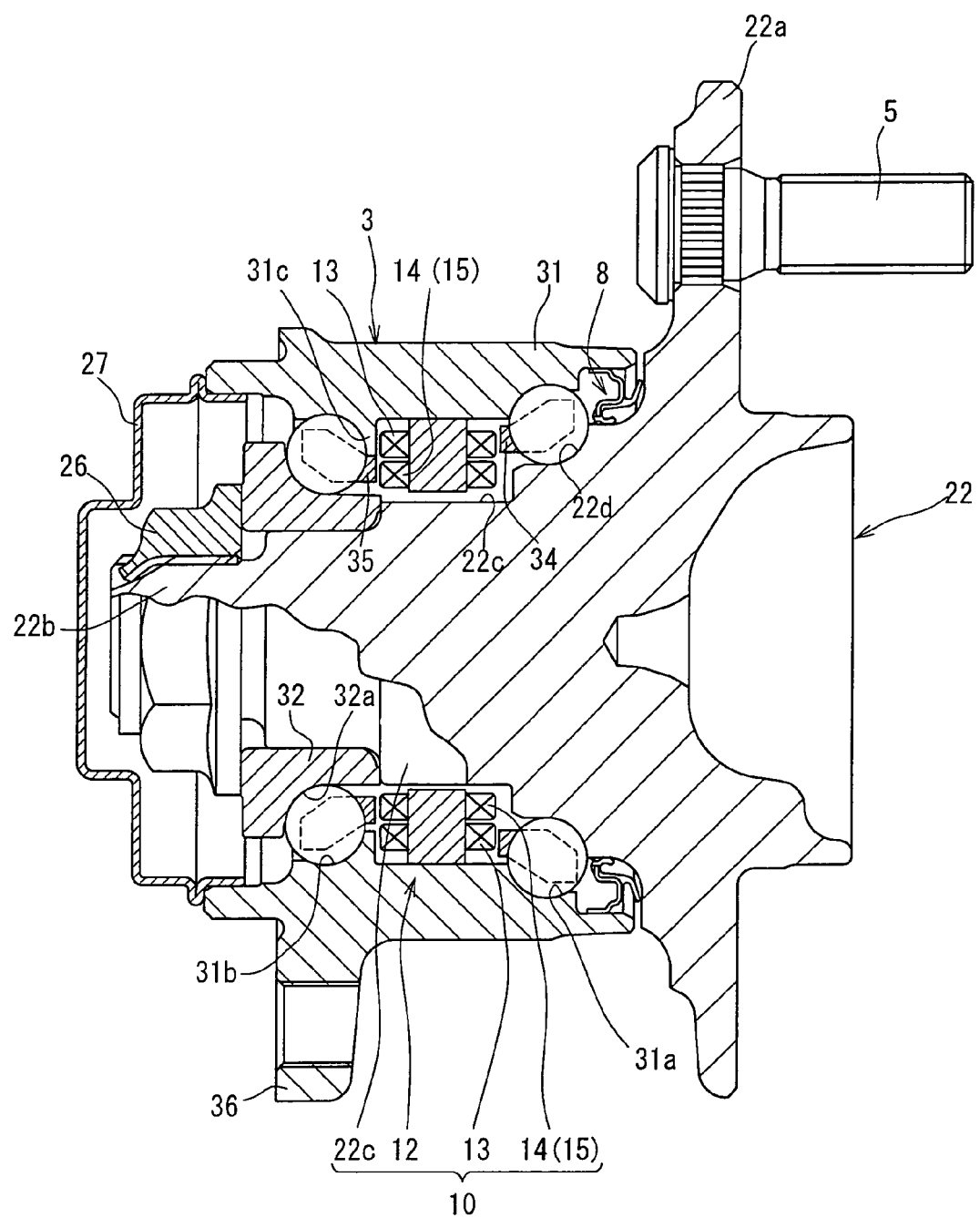
FIG. 10 is a cross-sectional view showing a wheel-use rolling bearing apparatus according to a still further embodiment of the present invention.

As shown in FIG. 10, the circular diameter (PCD) connecting each of the ball group 33 on the vehicle outer side row is set to be larger than the PCD of the ball group 33 on the vehicle inner side. Specifically, the raceway groove 31a on the vehicle outer side of the outer ring 31 is made to have a larger diameter than that of the raceway groove 31b on the vehicle inner side, while the raceway groove 22d of the hub wheel 22 is made to have a larger diameter than that of the raceway groove 32a of the inner ring 32. Thereby, the region of the outer ring 31 to which the resolver 10 is mounted is made to have a large diameter. In this case, due to a flange 31c facing the inward-radial direction provided between the mounting region of the resolver 10 in the outer ring 31 and the raceway groove 31b, displacement of the resolver 10 towards the vehicle inner side can be successfully restricted. In the above-described rolling bearing apparatus, the hub wheel 22 is made to be in a hollow shape and a driving shaft is spline-fitted to the center hole of the hub wheel 22 so as to prepare a drive wheel type.

The type of the above-described bearing apparatus may be various kinds of mitred type double row rolling bearings such as a tapered roller and the like. Provided that it is a mitred type double row ball bearing, the relative positions of the rotor and the stator of the resolver 10 can be maintained with high precision so that the accuracy of detecting the rotation state of the resolver 10 can be improved. Also, in other types of rolling bearing such as the tapered roller bearing, cylindrical roller bearing and the like, the precision in the radial direction and the axial direction is controlled with high precision so that the accuracy of detecting the rotation state of the resolver 10 can be improved.

Figure 11:
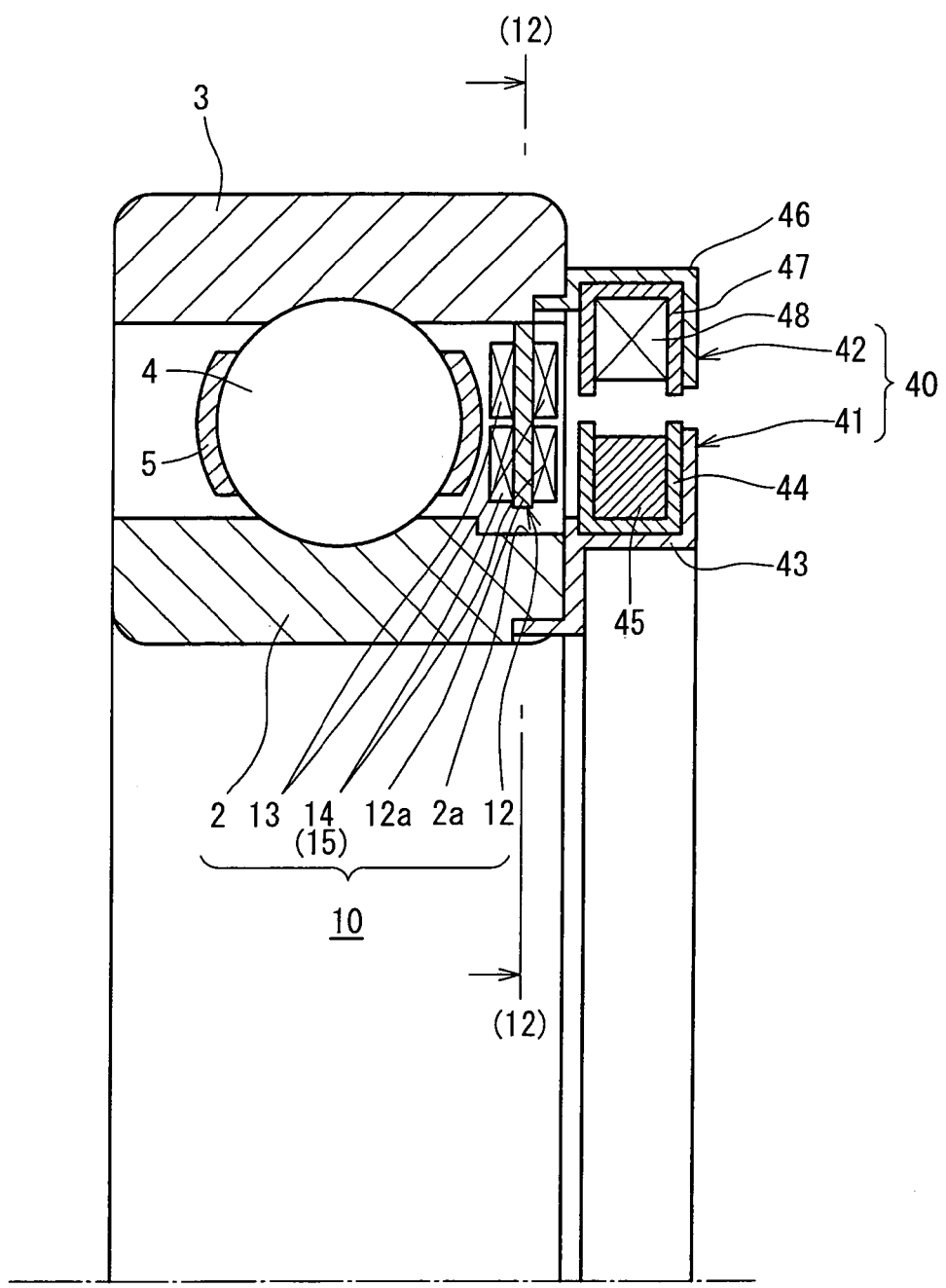
FIG. 11 is a cross-sectional view showing a rolling bearing apparatus according to a yet further embodiment of the present invention.
Figure 12:
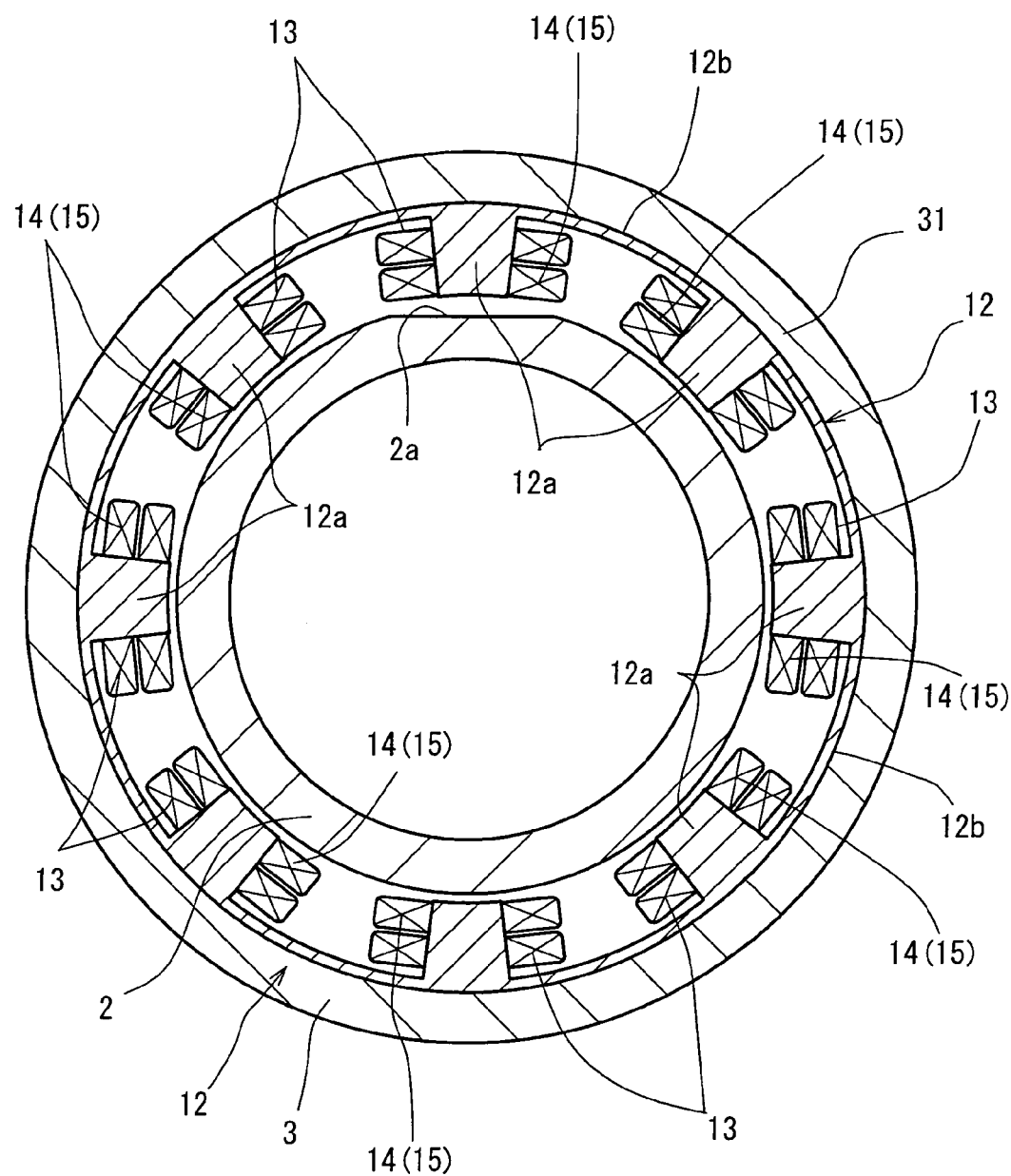
FIG. 12 is a perspective view taken along the line (12)-(12) in FIG. 11.
Figure 13:
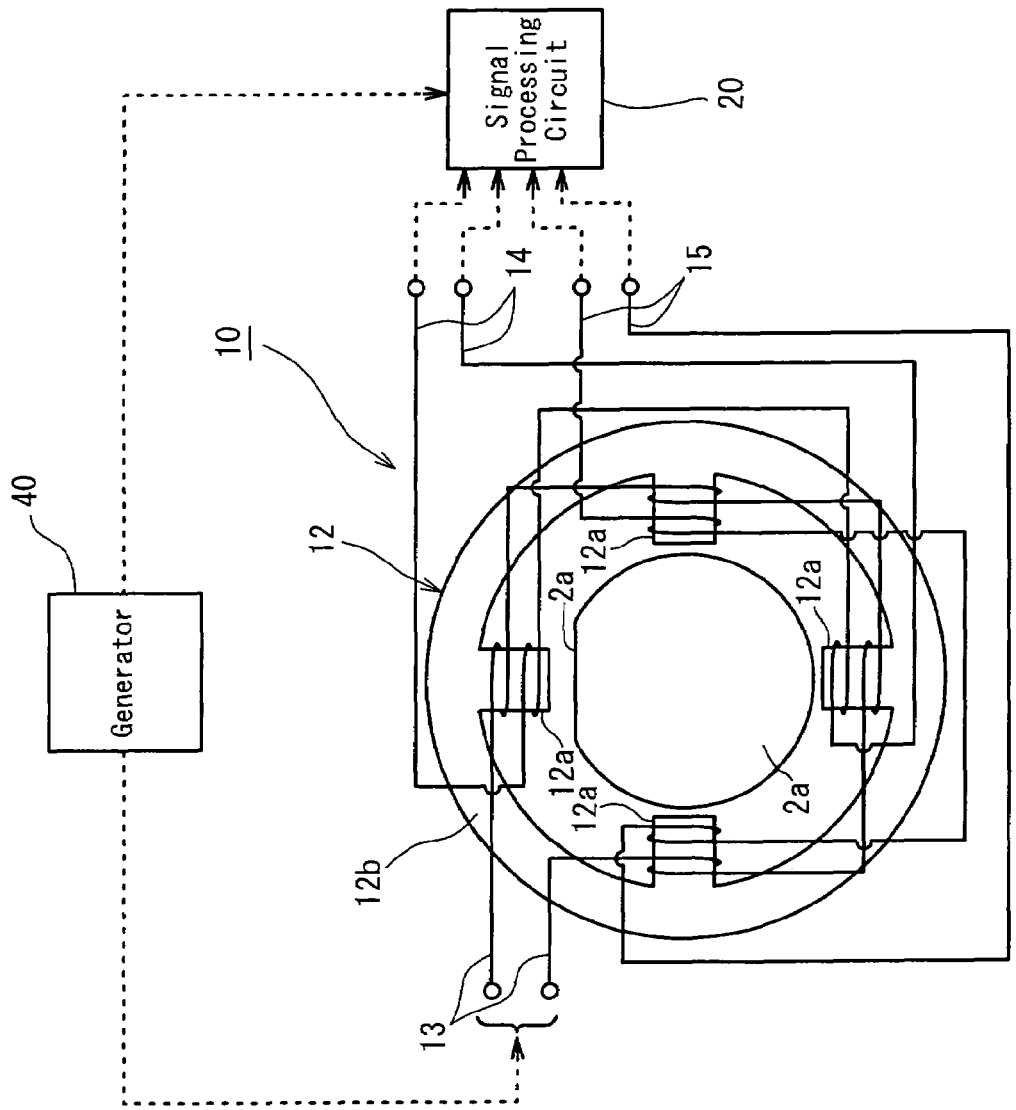
FIG. 13 is a schematic illustration showing a configuration of the rolling bearing apparatus shown in FIG. 11.

As shown in FIG. 11 to FIG. 13, the rolling bearing apparatus comprises the inner ring 2, the outer ring 3, a plurality of balls 4, and a cage 5. These are the same as the one shown in FIG. 1. The resolver 10 and an AC generator 40 are installed to the rolling bearing apparatus.

The exciting winding 13 of the resolver 10 is wound in series to the tooth 12a of the stator 12. The output windings 14, 15 are distributed-wound to each tooth 12a so that each induced voltage distribution becomes a sine wave distribution. When the sine wave exciting voltage is inputted to the exciting winding 13, two-phase alternating voltage signals, which are electrically shifted from each other at 90°, are outputted from each of the output windings 14, 15. For example, when the sine wave exciting voltage is inputted to the exciting winding 13, a sine wave signal is outputted from the output winding 14 and a cosine wave signal which is shifted from the sine wave signal at 90° is outputted from the output winding 15.

The AC generator 40 generates a sine wave voltage in accordance with the rotation of the inner ring 2 and applies the voltage as an input exciting voltage to the resolver 10. The AC generator 40 comprises a generating rotor 41 being unified on the inner ring 2 side and a generating stator 42 being unified on the outer ring 3 side. The generating rotor 41 comprises a bracket 43 mounted to the inner ring 2 on the outer side of the resolver 10, an iron core 44 mounted to the bracket 43, and a circular magnet 45 having magnetic poles with different polarities being alternately disposed in the circumferential direction, which is mounted to the iron core 44 with only the outer side being exposed. The generating stator 42 comprises a bracket 46 mounted to the outer ring 3 on the outer side of the resolver 10, an iron core 47 mounted to the bracket 46, and a generating coil 48 wound to the iron core 47 with only the inner side being exposed.

Now, the operation will be described. When the inner ring 2 rotates, the AC generator 40 generates a sine wave voltage. The sine wave voltage generated in the AC generator 40 is applied as one-phase alternating voltage (input exciting voltage) to the exciting winding 13 of the resolver 10. On the other hand, in accordance with the rotation of the inner ring 2, the gap permeance between the outer peripheral surface of the inner ring 2 and each tooth 12a of the detection stator 12 of the resolver 10 change and signals whose amplitudes change without phase are outputted from the output windings 14, 15 of the resolver 10. These signals are inputted to the signal processing unit 2 through a signal wire (not shown).

The AC generator 40 is mounted onto the above-described rolling bearing apparatus so that it becomes unnecessary to provide an exciting voltage inputting device on the outside and also unnecessary to connect the resolver 10 to the exciting voltage inputting device through the signal wire. Further, the resolver 10 and the AC generator 40 are closely disposed so that it becomes easy to electrically connect the resolver 10 to the AC generator 40 and the cost of equipment can be reduced.

Figure 14:
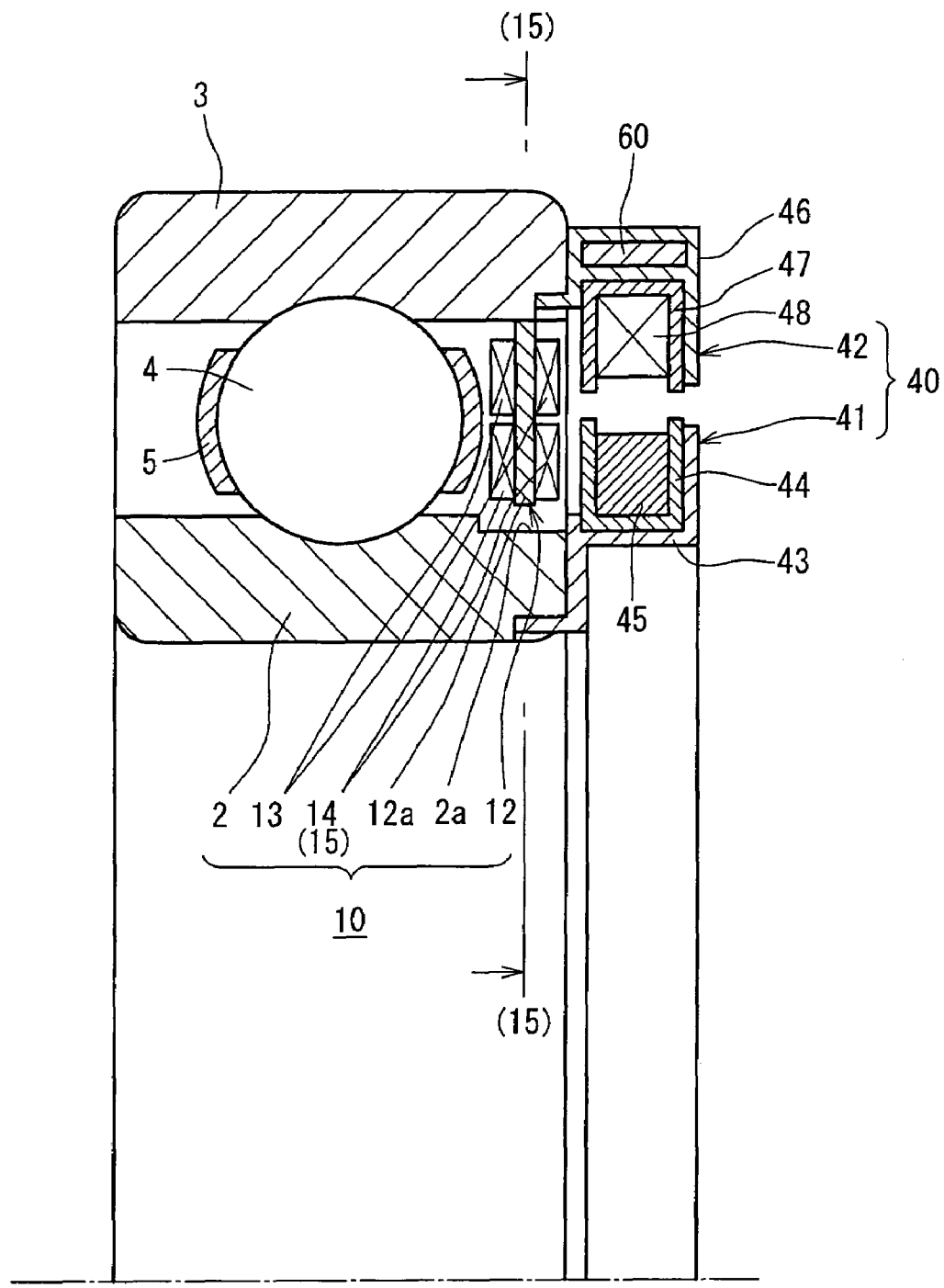
FIG. 14 is a cross-sectional view showing a rolling bearing apparatus according to a yet further embodiment of the present invention.
Figure 15:
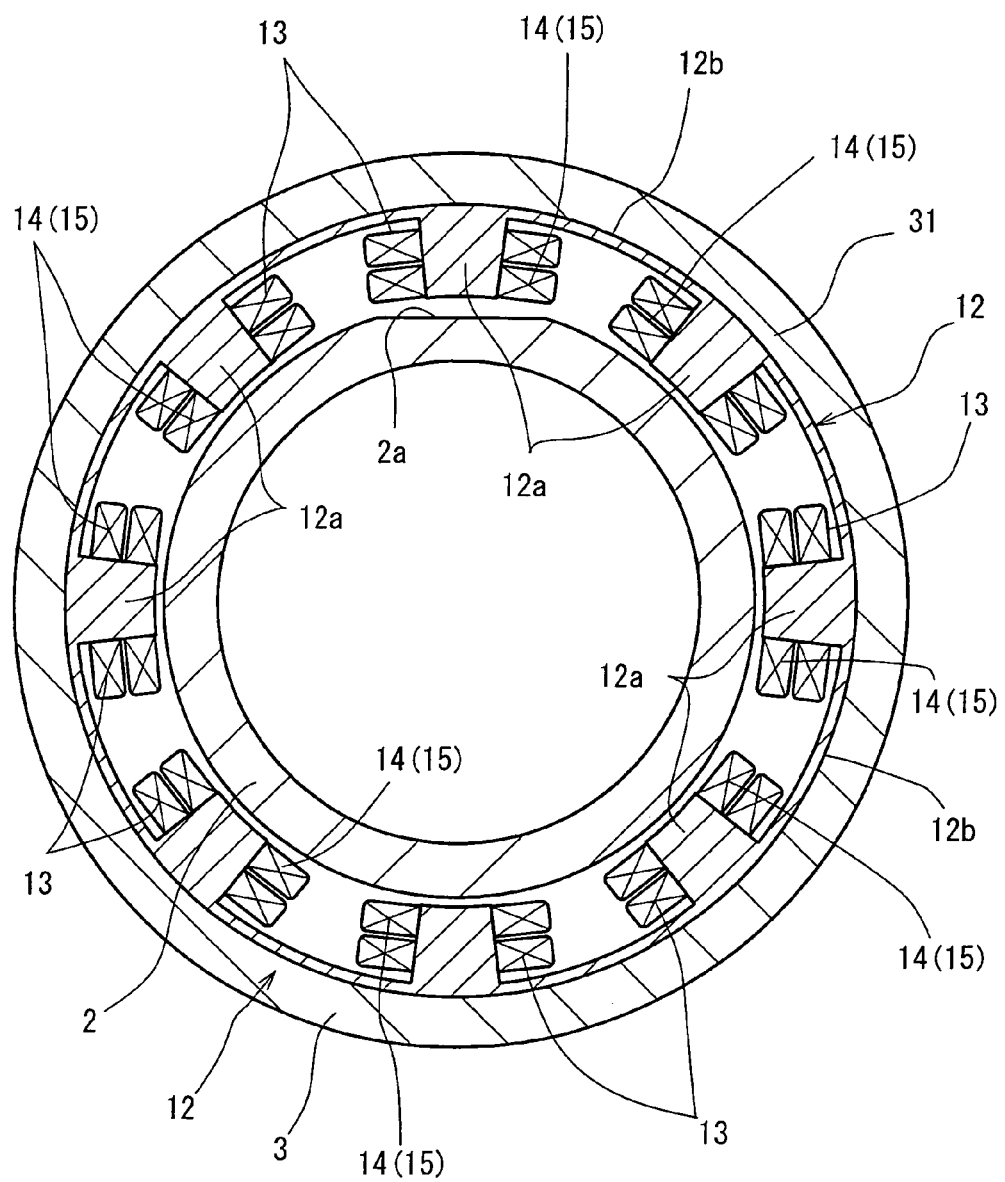
FIG. 15 is a perspective view taken along the line (15)-(15) in FIG. 14.
Figure 16:
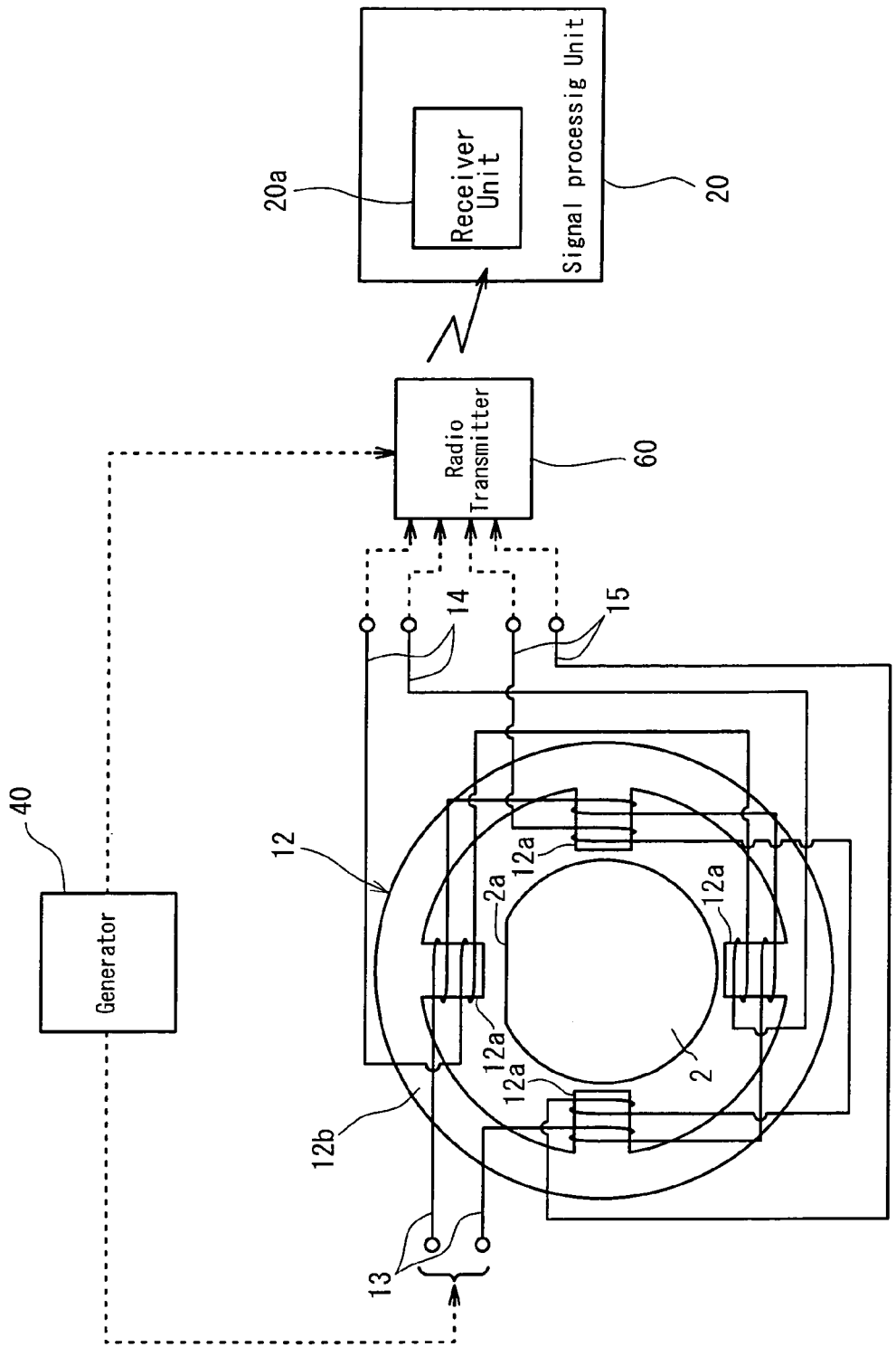
FIG. 16 is a schematic illustration showing a configuration of the rolling bearing apparatus shown in FIG. 14.

As shown in FIG. 14 to FIG. 16, the rolling bearing apparatus is further provided with a radio transmitter 60. The radio transmitter 60 radio-transmits the output signals of the resolver 10 to the signal processing unit 20 by radio waves, infrared rays, ultrasonic waves and the like. The signal processing unit 20 comprises a receiver unit 20a for receiving the transmitted signals from the radio transmitter 60. The radio transmitter 60 may be the one which performs transmission by magnetic coupling. In the case of using this transmission type, it may be formed using transmission coils which excites by a given frequency and a receiver coil generating a voltage by electromagnetic induction may be provided in the signal processing unit 20 as the receiver unit. The radio transmitter 60 is mounted to be unified on the outer side of the bracket 46 on the generating stator 42 side of the AC generator 40.

With the configuration described above, when the inner ring 2 rotates, the AC generator 40 generates a sine wave voltage. The sine wave voltage generated in the AC generator 40 is applied as one-phase alternating voltage (input exciting voltage) to the exciting winding 13 of the resolver 10 and also is supplied to the radio transmitter 60 as the driving voltage. On the other hand, in accordance with the rotation of the inner ring 2, the gap permeance between the outer peripheral surface of the inner ring 2 and each tooth 12a of the detection stator 12 of the resolver 10 change and signals whose amplitudes change without phase are outputted from the output windings 14, 15 of the resolver 10. The signals are inputted to the receiver unit 20a of the signal processing unit 20 through the radio transmitter 60. The signal processing unit 20 recognizes the rotation state (rotation direction, rotation angle, rotation speed and the like) of the inner ring 2 based on the signals received in the receiver unit 20a.

As described above, in the above-described rolling bearing apparatus, it becomes possible to detect the rotation state of the inner ring 2 with higher precision than that of the conventional active type rotation detector. Further, the inner ring 2 is also used as the detection rotor of the resolver 10 so that the configuration can be simplified and the cost can be reduced. Furthermore, the dimension of the inner peripheral surface of the outer ring 3 is adjusted with high precision by polishing and the like. Thus, the precision of mounting the resolver 10 can be improved, which contributes to the improvement in the detection accuracy of the resolver 10.

Further, the resolver 10, the radio transmitter 60 and the AC generator 40 are closely disposed so that it becomes easy to connect electrically connect the resolver 10, the radio transmitter 60 and the AC generator 40, respectively, and the cost of equipment can be reduced.

Figure 17:
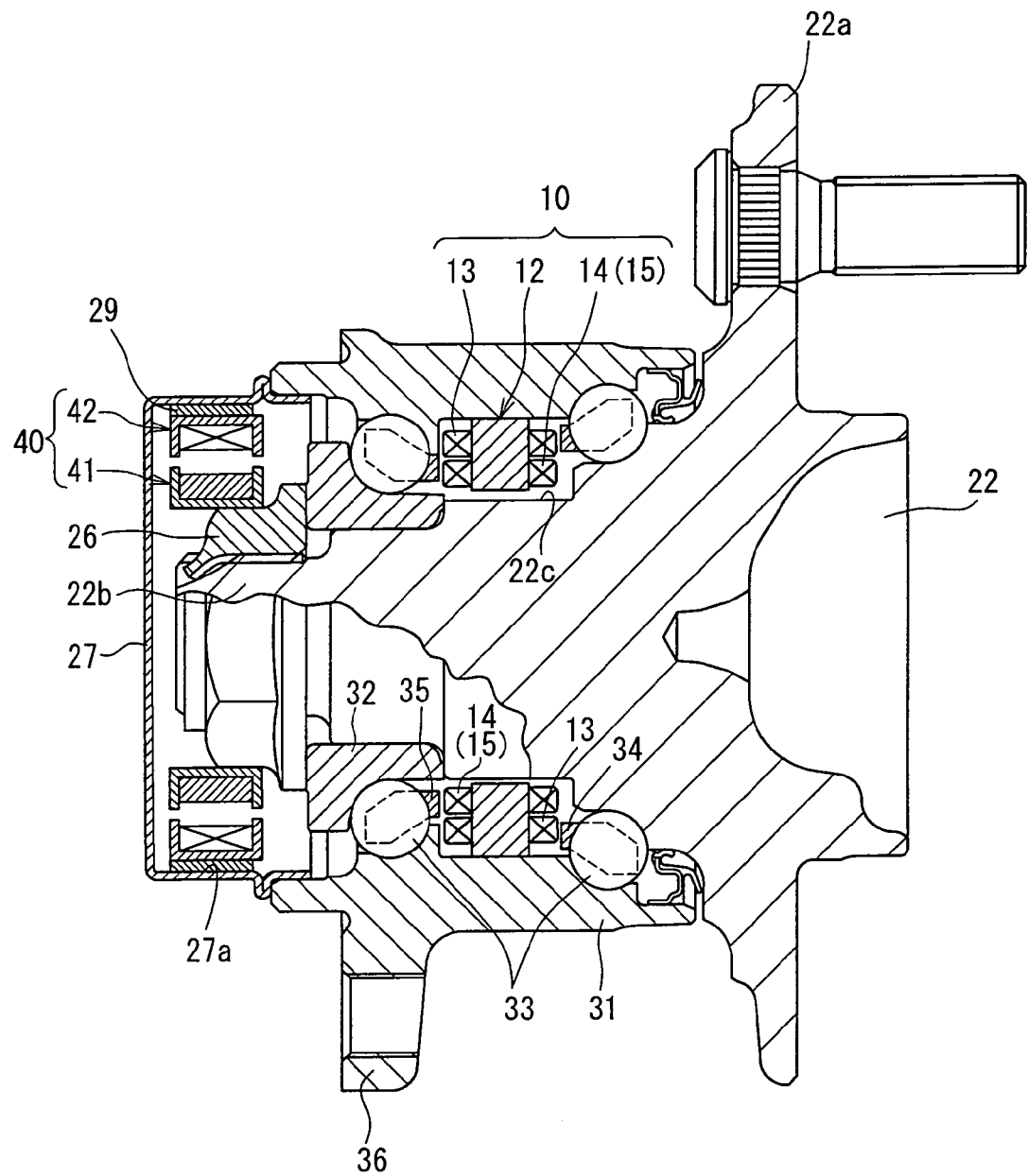
FIG. 17 is a cross-sectional view showing a rolling bearing apparatus according to a yet further embodiment of the present invention.

As shown in FIG. 17, the rolling bearing apparatus has a double row ball bearing structure to which the resolver 10 and the AC generator 40 are installed. The resolver 10 is provided in the inner peripheral surface between two raceway grooves of the outer ring 31. The AC generator 40 is provided inside the cap 27. Specifically, the stator 12 of the resolver 10 is installed in the inner peripheral region in the intermediate area of the outer ring 31 as the rolling element in the axial direction and the hub wheel 22 as the rolling element is also used as the rotor of the resolver 10. In other words, the flat portion 22a is provided in the region of the outer peripheral surface of the hub wheel 22, which opposes the stator 12 in the radial direction and the hub wheel 22 whose outer peripheral surface is made to have a different diameter due to the flat portion 22c is used as the detection rotor. The generating stator 42 of the AC generator 40 is fixed by being fitted to the inner peripheral surface of the cylindrical part 27a of the cap 27 through a non-magnetic material 29. The generating rotor 41 of the AC generator 40 is fixed to the outer periphery of the hexagonal nut as the rolling element which connects the hub wheel 22 and the inner ring 32 on the vehicle inner side of the hub wheel 22. In the rolling bearing apparatus, the operation of the resolver 10 and the AC generator 40 are basically the same as the ones described above.

In the embodiment, in addition to the one in which the circular diameters (PCD) connecting the centers of the balls 33 in each row are the same, the present invention can be broadly applied to various known types of wheel-use rolling bearing apparatus. Further, a radio transmitter can be installed to the rolling bearing apparatus. In this case, the radio transmitter can be mounted, for example, to a prescribed region on the circumference of the outer peripheral surface of the cylindrical part of the cap. The operation in this case is basically the same as the above-described embodiments.

Figure 18:
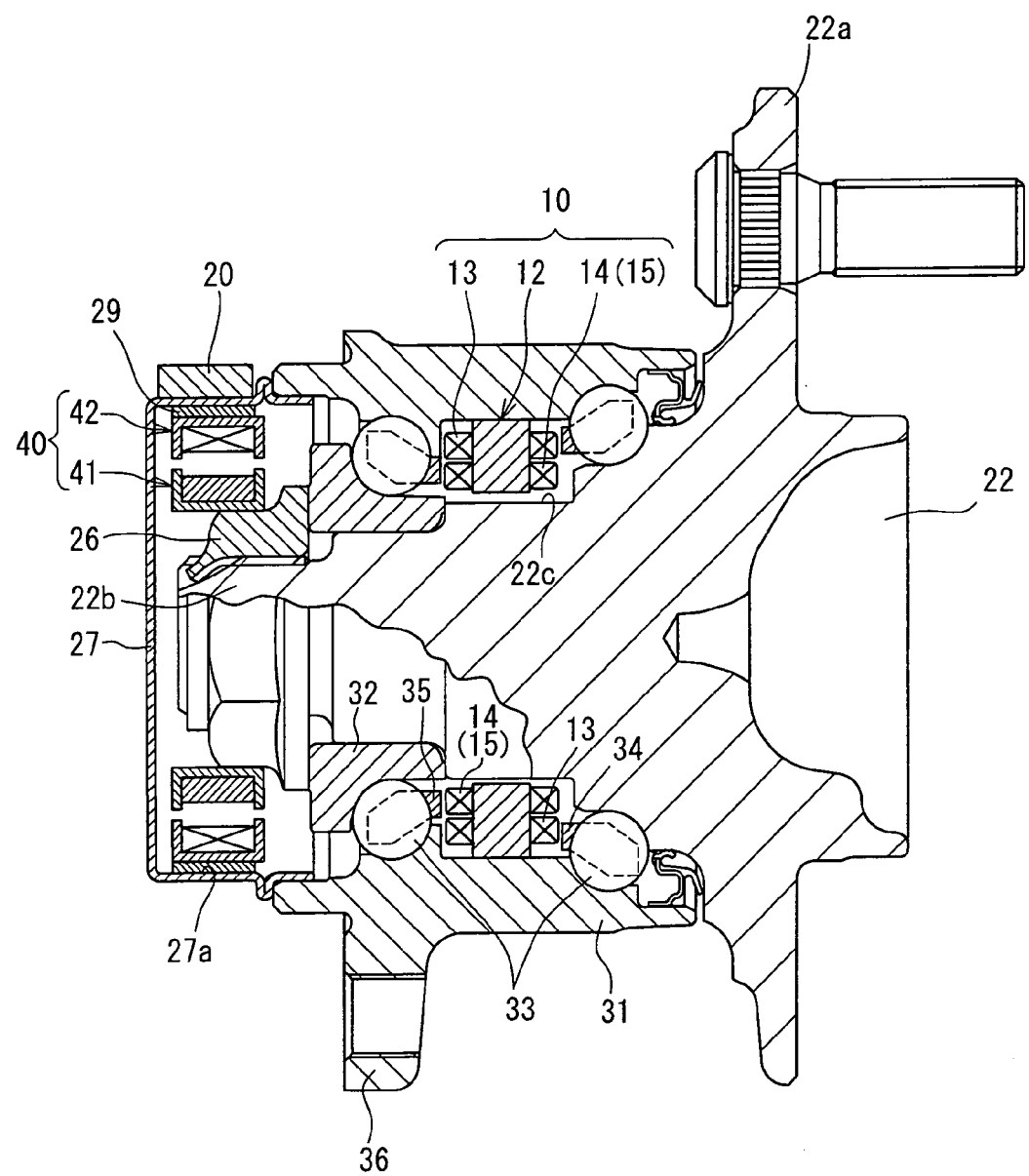
FIG. 18 is a cross-sectional view showing a rolling bearing apparatus according to a yet further embodiment of the present invention.

As shown in FIG. 18, the resolver 10, the radio transmitter 60 and the AC generator 40 are installed to the rolling bearing apparatus, while the signal processing unit 20 is provided in the outer peripheral surface of the cap 27. The resolver 10 is provided in the inner peripheral region between two raceway grooves of the outer ring 31 and the radio transmitter 60 is mounted in the outer peripheral surface of the cylindrical part 27a of the cap 27. Further, the AC generator 40 is provided inside the cap 27. Specifically, the stator 12 of the resolver 10 is mounted in the inner peripheral region in the intermediate area of the outer ring 31 in the axial direction and the hub wheel 22 is also used as the rotor of the resolver 10. That is, the flat portion 22a is provided in the region of the outer peripheral surface of the hub wheel 22, which opposes the stator 12 in the radial direction and the hub wheel 22 whose outer peripheral surface is made to have a different diameter due to the flat portion 22c is used as the detection rotor. The generating stator 42 of the AC generator 40 is fixed by being fitted to the inner peripheral surface of the cylindrical part of the cap 27 through a non-magnetic material 29. The generating rotor 41 of the AC generator 40 is fixed to the outer periphery of the hexagonal nut as the rolling element which connects the hub wheel 22 to the inner ring 32 on the vehicle inner side of the hub wheel 22. In the embodiment, the operation of the resolver 10, the radio transmitter 60 and the AC generator 40 are also basically the same as the ones described above.

The positional relation of the stator 12 and the detection rotor of the resolver 10 may be reversed from the one described above, i.e., the stator 12 may be disposed on the inner side and the rotor is disposed on the outer side. For example, as the above-described rolling bearing apparatus, there may be a case where the outer ring 32 is made rotatable and the inner ring 32 is made non-rotatable. In this case, the rotor of the resolver 10 may be mounted to be unified with the outer ring 31 and the stator 12 of the resolver 10 may be mounted to the inner ring 32 as the non-rolling element.

INDUSTRIAL APPLICABILITY

The present invention can be used as a detection apparatus for detecting the rotation state in a vehicle such as an automobile.

What is claimed is:

1. A rolling bearing apparatus, comprising:
a rolling element formed as an inner ring of a bearing;
a non-rolling element disposed concentrically with said rolling element;
a rotation detector for outputting an induced voltage produced by an input exciting voltage according to a relative rolling state of said rolling element and said non-rolling element;
said rotation detector comprising:
   a rotor provided as part of said inner ring;
   a stator provided on said non-rolling element: and
   an exciting winding and output windings wound to said stator, wherein
   said output windings output the induced voltage induced according to a gap permeance between said rotor and said stator in response to said exciting voltage inputted to said exciting winding;
said stator including a plurality of polar teeth opposing said rolling element, and said exciting winding and output windings being wound to each of said polar teeth of said stator, and
said rotor comprising a flat portion on a portion of a circumferential surface of said inner ring which opposes and is sensed by said plurality of polar teeth and is an outer peripheral shoulder of said inner ring.

2. The rolling bearing apparatus according to claim 1, further comprising a radio transmitter for radio-transmitting signals outputted from said rotation detector to a signal processing unit provided outside.

3. The rolling bearing apparatus according to claim 2, further comprising a signal processing unit for processing output signal from said radio transmitter.

4. The rolling bearing apparatus according to claim 1, further comprising a signal processing unit for processing output signals from said rotation detector.

5. The rolling bearing apparatus according to claim 1, wherein said rotation detector comprises a resolver which induces the voltage according to a gap permeance between said rotor and said stator in response to an exciting voltage inputted to said exciting winding from said output windings.

6. The rolling bearing apparatus according to claim 1, wherein said non-rolling element opposes said rolling element at least in part in a radial direction of the rolling bearing apparatus.

7. A rolling bearing apparatus, comprising:
a rolling element:
a non-rolling element disposed concentrically with said rolling element;
a rotation detector for outputting an induced voltage produced by an input exciting voltage according to a relative rolling state of said rolling element and said non-rolling element;
said rotation detector comprising:
a rotor provided on said rolling element;
a stator provided on said non-rolling element; and
an exciting winding and output windings wound to said stator, wherein
said output windings output the induced voltage induced according to a gap permeance between said rotor and said stator in response to said exciting voltage inputted to said exciting winding;
said rolling element comprising:
a hub wheel having first and second axial ends, said hub wheel having in sequential order from said first axial end a flange provided proximate said first end, an intermediate circumferential surface having a first diameter, a ring seat surface having a ring seat diameter less than said first diameter, and a threaded portion having an outer thread diameter less than said ring seat diameter; and
an inner ring mounted on said ring seat surface;
said non-rolling element being an outer ring disposed on an outer periphery of said hub wheel;
said stator being mounted in an axially center region of an inner circumferential surface of said outer ring; and
said rotor being formed by at least one notch provided at an area on said intermediate circumferential surface of said hub wheel.

8. A rolling hearing apparatus, comprising:
a rolling element;
a non-rolling element disposed concentrically with said rolling element;
a rotation detector for outputting an induced voltage produced by an input exciting voltage according to a relative rolling state of said rolling element and said non-rolling element;
said rotation detector comprising:
a rotor provided on said rolling element;
a stator provided on said non-rolling element; and
an exciting winding and output windings wound to said stator, wherein
said output windings output the induced voltage induced according to a gap permeance between said rotor and said stator in response to said exciting voltage inputted to said exciting winding;
said rolling element comprising:
a hub wheel having first and second axial ends, said hub wheel having in sequential order from said first axial end a flange provided proximate said first axial end, an outer circumferential portion with a first inner raceway groove having a first inner raceway groove diameter, an intermediate circumferential surface having a first diameter, a ring seat surface having a ring seat diameter less than said first diameter, and a threaded portion having an outer thread diameter less than said ring seat diameter; and
an inner ring mounted on said ring seat surface and having a second inner raceway groove having a second inner raceway groove diameter less than said first inner raceway groove diameter;
said non-rolling element being an outer ring disposed concentrically with said hub wheel and having first and second outer raceway grooves in an inner circumferential surface of the non rolling element and respectively opposing said first and second inner raceway grooves;
a first set of balls disposed in said first inner and outer raceway grooves and having a first pitch circle diameter,
a second set of balls disposed in said second inner and outer raceway grooves and having a second pitch circle diameter less than said first pitch circle diameter;
said stator being mounted in an axially center region of an inner circumferential surface of said outer ring; and
said rotor being formed by notches provided at a plurality of areas on said intermediate circumferential surface.

9. A rolling bearing apparatus, comprising
a rolling element in the form of an inner bearing ring;
a non-rolling element disposed concentrically with said rolling element, said non-rolling element being in the form of an outer bearing ring;
a rotation detector for outputting an induced voltage produced by an input exciting voltage according to a relative rolling state of said rolling element and said non-rolling element;
a generator for generating a voltage using energy provided by relative rotation of said rolling element relative to said non-rolling element and inputting the voltage as an input exciting voltage to said rotation detector, said generator having a first portion mounted to said inner bearing ring and a second portion mounted to said outer bearing ring, said generator comprising:
a generating rotor provided as said first portion in said rolling element by disposing magnetic poles with different polarities alternately in a circumferential direction; and
a generating stator provided as said second portion in said non-rolling element and having an electric coil opposing the magnetic poles of said generating rotor in an radial direction, the electric coil producing the voltage input as said exciting voltage; and
said rotation detector comprising:
a rotor provided on said rolling element;
a stator provided on said non-rolling element; and
an exciting winding and output windings wound to said stator, wherein
said output windings output the induced voltage induced according to a gap permeance between said rotor and said stator in response to said exciting voltage inputted to said exciting winding.

10. The rolling bearing apparatus according to claim 9, further comprising a signal processing unit for processing output from said generator.

11. The rolling bearing apparatus, comprising:
a rolling element;
a non-rolling element disposed concentrically with said rolling element;
a rotation detector for outputting an induced voltage produced by an input exciting voltage according to a relative rolling state of said rolling element and said non-rolling element;
said rotation detector comprising:
a rotor provided on said rolling element;
a stator provided on said non-rolling element; and an exciting winding and output windings wound to said stator, wherein said output windings output the induced voltage induced according to a gap permeance between said rotor and said stator in response to said exciting voltage inputted to said exciting winding; and said stator including a plurality of polar teeth opposing said rolling element, and said exciting winding and output windings being wound to each or said polar teeth of said stator, said rotor comprising a flat portion on a portion of a circumferential surface of said rolling element which opposes said plurality or polar teeth;

a radio transmitter for radio-transmitting signals outputted from said rotation detector to a signal processing unit provided outside; and a generator for generating a voltage using energy provided by relative rotation of said rolling element and said non-rolling element, and inputting the voltage as an input exciting voltage to said rotation detector while supplying the voltage as a driving voltage to said radio transmitter, said generator comprising:

a generating rotor provided to said rolling element by disposing magnetic poles with different polarities alternately in a circumferential direction; and a generating stator provided to said non-rolling element and having an electric coil opposing the magnetic poles of said generating rotor in an radial direction, the electric coil producing the voltage input as said exciting voltage.

12. A rolling bearing apparatus, comprising:

a rolling element including a first raceway wheel;

a non-rolling element disposed concentrically with said rolling element and including a second raceway wheel, said rolling element rolling with respect to said non-rolling element;

a rotation detector providing an induced voltage output produced from an input exciting voltage and influenced according to a gap permeance related to a relative rolling state of said rolling element and said non-rolling element;

a rotor disposed in said rolling element;

a stator disposed in said non-rolling element;

an exciting winding and output windings disposed on said stator, said exciting winding being excited by said exciting voltage and said output winding providing said induced voltage output;

said rotor and said stator being disposed opposing one another in an annular space between said rolling element and said non-rolling element; and said output windings outputting said induced voltage output at a level determined by the gap permeance between said rotor and said stator and by said input exciting voltage, wherein said rolling element is an inner ring of a bearing and said non-rolling element is an outer ring of the bearing, and said rotor is formed of the inner ring and includes a flat portion of an outer circumferential surface of the inner ring sensed by the stator.

* * * * *